United States Patent
Jinnai et al.

(10) Patent No.: US 12,152,669 B2
(45) Date of Patent: Nov. 26, 2024

(54) WORK VEHICLE

(71) Applicant: KUBOTA CORPORATION, Osaka (JP)

(72) Inventors: Atsushi Jinnai, Osaka (JP); Ryoma Iwase, Osaka (JP); Yusuke Nabana, Osaka (JP); Rikuto Araki, Osaka (JP); Makoto Kubota, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/201,835

(22) Filed: May 25, 2023

(65) Prior Publication Data

US 2023/0407962 A1    Dec. 21, 2023

(30) Foreign Application Priority Data

Jun. 21, 2022   (JP) ................. 2022-099420

(51) Int. Cl.
*F16H 61/30*   (2006.01)

(52) U.S. Cl.
CPC .................. *F16H 61/30* (2013.01)

(58) Field of Classification Search
CPC ...... F16H 61/30; F16D 25/0638; F16D 25/12; F16D 25/10
See application file for complete search history.

(56) References Cited

U.S. PATENT DOCUMENTS

| | | | | |
|---|---|---|---|---|
| 4,529,073 A | * | 7/1985 | Lewis | F16D 25/123 192/113.36 |
| 4,648,495 A | * | 3/1987 | Vater | F16D 25/0638 192/113.36 |
| 9,909,661 B2 | * | 3/2018 | Naito | F16H 57/082 |
| 10,677,293 B2 | * | 6/2020 | Herman | F16H 63/3026 |
| 11,592,082 B2 | * | 2/2023 | Hana | F15B 21/041 |
| 2016/0146337 A1 | * | 5/2016 | Naito | F16H 3/728 475/116 |

(Continued)

FOREIGN PATENT DOCUMENTS

| | | |
|---|---|---|
| EP | 3 798 468 A2 | 3/2021 |
| JP | 2012-149769 A | 8/2012 |

OTHER PUBLICATIONS

European Search Report issued Oct. 24, 2023 in European family member application No. 23175915.0.

*Primary Examiner* — Michael A Riegelman
(74) *Attorney, Agent, or Firm* — Greenblum & Bernstein, P.L.C.

(57) ABSTRACT

A work vehicle includes:
a power transmission shaft drivable to rotate;
a shaft holder holding the power transmission shaft in such a manner that the power transmission shaft is rotatable; and
a hydraulically operable section configured to operate in response to receiving operating oil,
the power transmission shaft including:
a shaft groove extending entirely around an outer circumferential portion of the power transmission shaft;
an inlet port extending inside the power transmission shaft in a radial direction of the power transmission shaft and connected with the shaft groove; and
a supply oil passage extending inside the power transmission shaft in a longitudinal direction of the power transmission shaft and connected with the inlet port inside the power transmission shaft.

6 Claims, 7 Drawing Sheets

(56) References Cited

U.S. PATENT DOCUMENTS

| | | | |
|---|---|---|---|
| 2019/0048943 A1* | 2/2019 | Park .................. | F16D 25/12 |
| 2021/0071740 A1* | 3/2021 | Hana .................. | F16H 37/0813 |
| 2021/0094416 A1* | 4/2021 | Tsuchida ............. | F16H 57/0494 |
| 2021/0364074 A1* | 11/2021 | Hirase ................. | B60K 17/10 |
| 2022/0153132 A1* | 5/2022 | Sonoda ................ | B60K 17/02 |
| 2022/0196128 A1* | 6/2022 | Yamaguchi .......... | F16H 61/47 |
| 2022/0290748 A1* | 9/2022 | Gono .................. | B60K 17/10 |
| 2022/0397189 A1* | 12/2022 | Jinnai .................. | F16H 57/031 |
| 2023/0204093 A1* | 6/2023 | Tsuchida ............. | F16H 63/3026 475/160 |
| 2023/0204096 A1* | 6/2023 | Jinnai .................. | F16H 37/022 180/53.1 |
| 2023/0271497 A1* | 8/2023 | Tsuchida ............. | F16H 57/043 180/248 |
| 2023/0407962 A1* | 12/2023 | Jinnai .................. | F16H 61/30 |

\* cited by examiner

WORK VEHICLE

BACKGROUND OF THE INVENTION

Field of the Invention

The present invention relates to a work vehicle configured to supply operating oil to a hydraulically operable section such as a hydraulic clutch through a supply oil passage in a power transmission shaft drivable to rotate.

Description of the Related Art

Japanese Unexamined Patent Application Publication, Tokukai, No. 2012-149769 discloses supplying operating oil from a hydraulic pump, a control valve, or the like through a supply oil passage in a power transmission shaft to a hydraulically operable section, and specifically discloses how the operating oil is supplied into the supply oil passage (see FIG. 13, the portion indicated with reference numeral "96" and its surroundings).

SUMMARY OF THE INVENTION

Japanese Unexamined Patent Application Publication, Tokukai, No. 2012-149769 discloses rotating the power transmission shaft to rotate an inlet port relative to a supply port of a shaft holder, meaning a repeated switch between a state where the inlet port coincides with and faces the supply port and a state where the inlet port is apart from the supply port.

Operating oil, when exiting the supply port and entering the inlet port, tends to have a pressure loss that is relatively large with the inlet port slightly past the supply port and that is relatively small with the inlet port farthest apart from the supply port.

This means a repeated switch between a state where the operating oil has a high pressure (with a small pressure loss) and a state where the operating oil has a low pressure (with a large pressure loss) through the rotation of the power transmission shaft. This pulsation of the pressure of operating oil may cause the hydraulically operable section, which receives the operating oil, to malfunction.

The present invention has an object of providing a work vehicle that is configured to supply operating oil to a hydraulically operable section through a supply oil passage in a power transmission shaft drivable to rotate and that prevents the hydraulically operable section from malfunctioning.

A work vehicle according to the present invention includes:
a power transmission shaft drivable to rotate;
a shaft holder holding the power transmission shaft in such a manner that the power transmission shaft is rotatable; and
a hydraulically operable section configured to operate in response to receiving operating oil,
the power transmission shaft including:
a shaft groove extending entirely around an outer circumferential portion of the power transmission shaft;
an inlet port extending inside the power transmission shaft in a radial direction of the power transmission shaft and connected with the shaft groove; and
a supply oil passage extending inside the power transmission shaft in a longitudinal direction of the power transmission shaft and connected with the inlet port inside the power transmission shaft,
the shaft holder including:
an outer flow path in a shape of a ring around the shaft groove;
a first supply port connected with the outer flow path and configured to receive operating oil; and
at least one second supply port extending from the outer flow path to an inner circumferential portion of the shaft holder and communicating with the shaft groove,
the work vehicle being configured to cause operating oil to be supplied from the first supply port sequentially through the outer flow path, the at least one second supply port, the shaft groove, the inlet port, and the supply oil passage to the hydraulically operable section.

The work vehicle is configured as follows: Operating oil supplied to the first supply port of the shaft holder flows through the first supply port into the outer flow path. The operating oil then flows from the outer flow path through the second supply port into the shaft groove of the power transmission shaft. The operating oil then flows from the shaft groove through the inlet port and the supply oil passage to be supplied to the hydraulically operable section.

The work vehicle has an outer oil passage in the shaft holder between the first supply port of the shaft holder and the shaft groove of the power transmission shaft along the flow of operating oil. The outer flow path of the shaft holder is in the shape of a ring around the shaft groove of the power transmission shaft. The outer flow path is thus relatively long along the circumference, and has a relatively large capacity. The outer oil passage of the shaft holder, which is configured as above, reduces the pressure loss of operating oil and prevents an abrupt change in the pressure of operating oil.

Thus, while a switch is repeated between a state where the operating oil has a high pressure (with a small pressure loss) and a state where the operating oil has a low pressure (with a large pressure loss), the outer oil passage, when the operating oil transitions from the state where the operating oil has a low pressure to the state where the operating oil has a high pressure, prevents an abrupt increase in the pressure of the operating oil and thereby prevents the pressure from becoming excessively high.

Similarly, the outer oil passage, when the operating oil transitions from the state where the operating oil has a high pressure to the state where the operating oil has a low pressure, prevents an abrupt decrease in the pressure of the operating oil and thereby prevents the pressure from becoming excessively low.

The work vehicle prevents the pressure of operating oil from becoming excessively high or excessively low, and thereby has only a small difference between the state where the operating oil has a high pressure and the state where the operating oil has a low pressure. This reduces the pulsation of the pressure of operating oil and prevents the hydraulically operable section from malfunctioning.

The work vehicle may preferably be further configured such that the at least one second supply port includes a plurality of second supply ports spaced from each other along a circumference of the inner circumferential portion of the shaft holder.

The above work vehicle is configured such that the shaft holder includes a plurality of second supply ports. This allows the inlet port of the power transmission shaft to coincide with and face a second supply port of the shaft holder two or more times through a single rotation of the power transmission shaft.

With the above configuration, when the inlet port of the power transmission shaft has moved past a second supply port of the shaft holder such that the operating oil transitions from the state where the operating oil has a high pressure (with a small pressure loss) to the state where the operating oil has a low pressure (with a large pressure loss), the inlet port faces another second supply port before the pressure of the operating oil becomes excessively low, so that the operating oil is in the state where the operating oil has a high pressure.

The work vehicle prevents an excessive decrease in the pressure of operating oil in the state where the operating oil has a high pressure, and thereby has only a small difference between the state where the operating oil has a high pressure and the state where the operating oil has a low pressure. This advantageously reduces the pulsation of the pressure of operating oil and prevents the hydraulically operable section from malfunctioning.

The work vehicle may preferably be further configured such that the first supply port is positioned differently from the plurality of second supply ports along the circumference of the inner circumferential portion of the shaft holder.

The above work vehicle is configured such that the first supply port of the shaft holder is positioned differently from the second supply ports. This prevents operating oil having flown through the first supply port into the outer oil passage from immediately flowing from the outer oil passage into a second supply port.

The above configuration allows operating oil having flown through the first supply port into the outer oil passage to tend to remain in the outer oil passage, and facilitates preventing an abrupt change in the pressure of operating oil in the outer oil passage. This advantageously reduces the pulsation of the pressure of operating oil and prevents the hydraulically operable section from malfunctioning.

The work vehicle may preferably be further configured such that the outer flow path has a first cross-sectional area on a plane orthogonal to the circumference of the inner circumferential portion of the shaft holder, whereas the shaft groove has a second cross-sectional area on a plane orthogonal to a circumference of the power transmission shaft, the first cross-sectional area being larger than the second cross-sectional area.

The above work vehicle is configured such that the outer oil passage of the shaft holder has a cross-sectional area larger than that of the shaft groove of the power transmission shaft, meaning that the outer flow path has a large capacity.

The above configuration allows facilitates preventing an abrupt change in the pressure of operating oil in the outer oil passage of the shaft holder. This advantageously reduces the pulsation of the pressure of operating oil and prevents the hydraulically operable section from malfunctioning.

The work vehicle may preferably further include: a cylinder attached to the inner circumferential portion of the shaft holder and holding the power transmission shaft in such a manner that the power transmission shaft is rotatable to allow the shaft holder to hold the power transmission shaft in such a manner that the power transmission shaft is rotatable, wherein the cylinder includes an outer groove extending entirely around an outer circumferential portion of the cylinder along a circumference of the inner circumferential portion of the shaft holder and defining the outer flow path together with the inner circumferential portion of the shaft holder, and the at least one second supply port is provided for the cylinder and extends from the outer groove to an inner circumferential portion of the cylinder.

The above work vehicle is configured such that the shaft holder has a first supply port, and includes a cylinder as a member separate from the shaft holder, the cylinder having an outer groove and a second supply port.

Attaching the cylinder to the inner circumferential portion of the shaft holder causes the inner circumferential portion and the outer groove to define an outer flow path of the shaft holder. The second supply port is provided for the shaft holder.

It is relatively easy to provide the outer groove and the second supply port for the cylinder, meaning that it is relatively easy to provide the first and second supply ports and the outer oil passage for the shaft holder. This reduces the production cost.

DETAILED DESCRIPTION OF THE PREFERRED EMBODIMENTS

Figure 1:
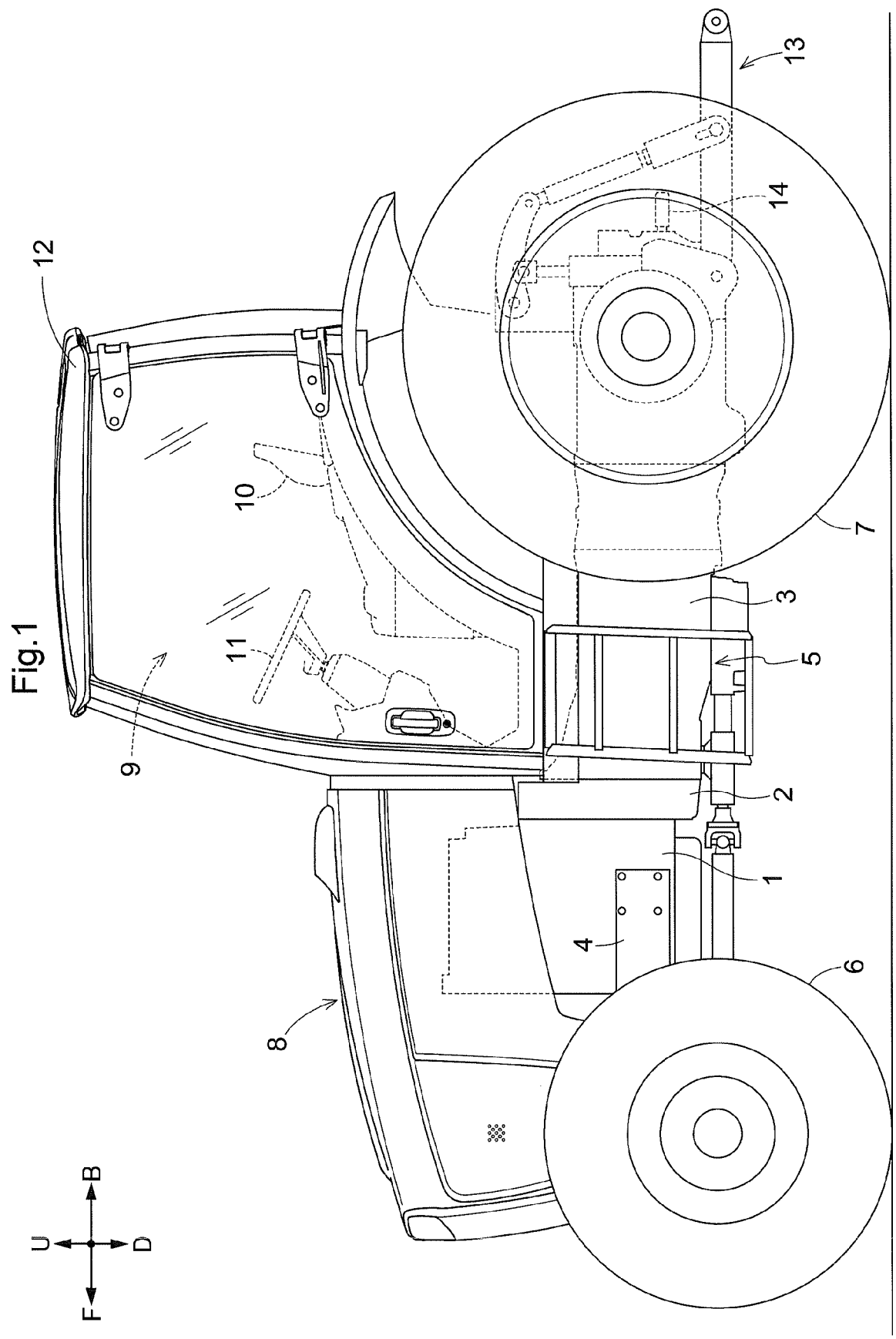
FIG. 1 is a left side view of a tractor.

FIGS. 1 to 9 illustrate a tractor as an example work vehicle. FIG. 1 shows "F" to indicate the forward direction, "B" to indicate the backward direction, "U" to indicate the upward direction, and "D" to indicate the downward direction.

Overall Configuration of Tractor

As illustrated in FIG. 1, the tractor includes a body 5, left and right front wheels 6, and left and right rear wheels 7, the front and rear wheels 6 and 7 supporting the body 5. The tractor also includes a hood 8 at a front portion of the body 5 and a driver section 9 at a back portion of the body 5.

The body 5 is provided with components such as an engine 1, a flywheel housing 2 coupled to a back portion of the engine 1, a transmission case 3 coupled to a back portion of the flywheel housing 2, and a front frame 4 coupled to a front portion of the engine 1.

The front wheels 6 are held by the front frame 4, whereas the rear wheels 7 are held by a back portion of the transmission case 3. The hood 8 covers the engine 1. The driver section 9 is covered by a cabin 12, and includes a driver's seat 10 and a steering wheel 11 for turning the front wheels 6.

The tractor also includes a link mechanism 13 and a PTO shaft 14. The link mechanism 13 is disposed at a back portion of the body 5 and linkable with any of various work devices (not illustrated in the drawings). The PTO shaft 14 is disposed at a back portion of the transmission case 3 and configured to transmit motive power to the work device.

Outline of Inside of Transmission Case

Figure 2:
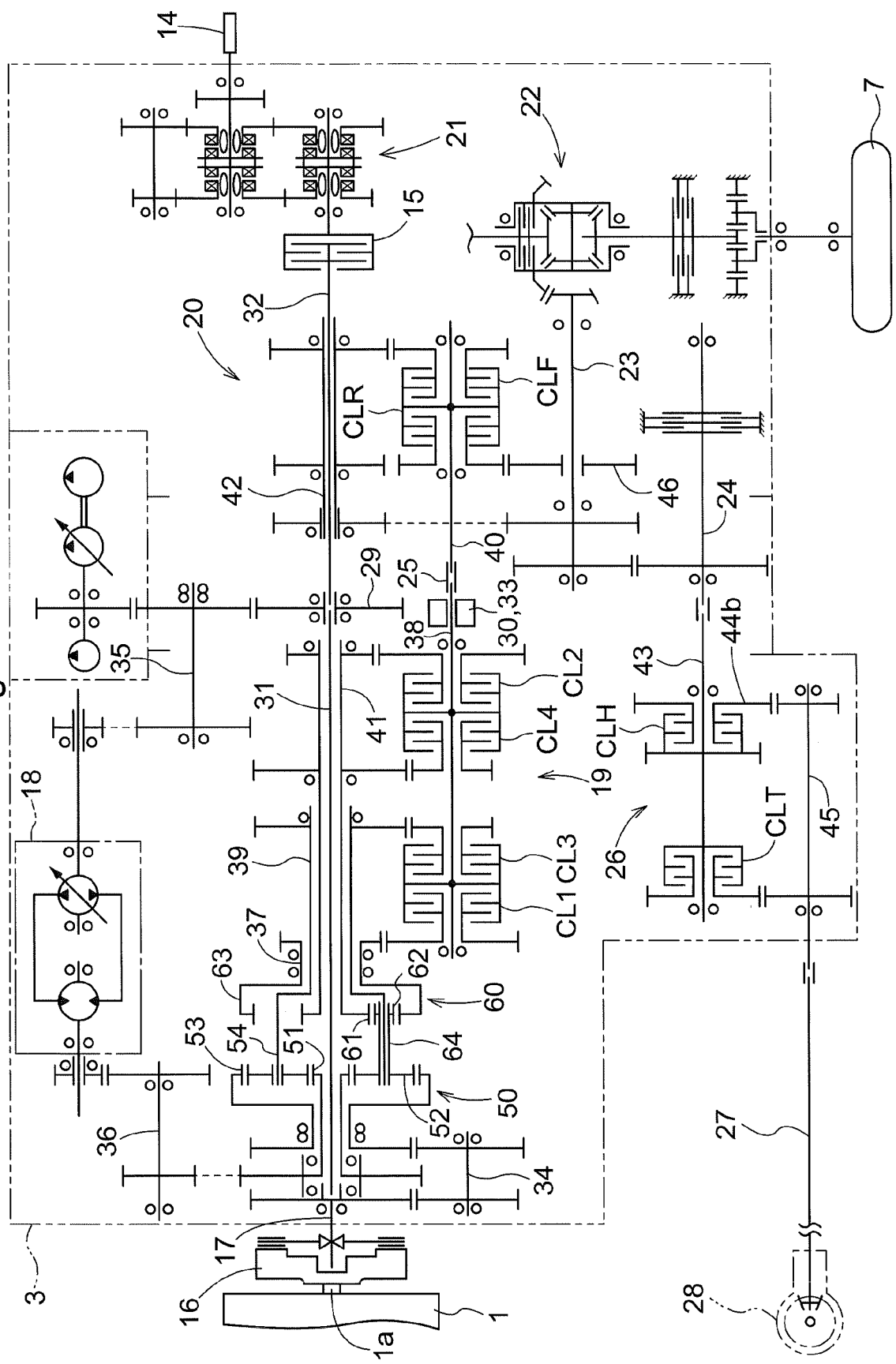
FIG. 2 is a diagram schematically illustrating a power transmission system in a transmission case.

As illustrated in FIG. 2, the transmission case 3 contains a first planetary device 50, a second planetary device 60, a continuously variable transmission device 18, a power transmission device 19, a forward/rearward travel switching device 20, a rear-wheel differential gear device 22, a front-wheel transmission device 26, a PTO clutch 15, and a PTO transmission device 21.

The engine 1 transmits motive power from its output shaft 1a through a clutch 16 to the input shaft 17 of the transmission case 3. The motive power is then transmitted from the input shaft 17 to a power transmission shaft 31 and a power transmission shaft 32. The power transmission shaft 32 transmits the motive power to the PTO clutch 15. The motive power is varied by the PTO transmission device 21 and transmitted to the PTO shaft 14.

The engine 1 transmits its motive power from its output shaft 1a through the clutch 16 to the first planetary device 50, the second planetary device 60, the continuously variable transmission device 18, and the power transmission device 19. The motive power is varied and transmitted to an output shaft 38 (which corresponds to the "power transmission shaft").

The motive power from the output shaft 38 is transmitted from a power transmission shaft to the forward/rearward travel switching device 20 and from a cylindrical power transmission shaft 42, which is rotatably attached to the power transmission shaft 32, to a power transmission shaft 23, to the rear-wheel differential gear device 22, and to the rear wheels 7.

The motive power from the power transmission shaft 23 is transmitted to a power transmission shaft 24 and through a power transmission shaft 43 to the front-wheel transmission device 26. The motive power from the front-wheel transmission device 26 is transmitted from a front-wheel output shaft 45 through a power transmission shaft 27 to a front-wheel differential gear device 28 and to the front wheels 6.

Configurations of First Planetary Device, Second Planetary Device, and Continuously Variable Transmission Device As illustrated in FIG. 2, the first planetary device 50 includes a sun gear 51, a plurality of planetary gears 52, and a ring gear 53, whereas the second planetary device 60 includes a sun gear 61, a plurality of planetary gears 62, and a ring gear 63. The first and second planetary devices 50 and 60 share a common carrier 54. The planetary gears 52 are coupled to the planetary gears 62 with a cylindrical power transmission shaft 64 attached to the carrier 54, so that the first and second planetary devices 50 and 60 constitute a compound planetary device.

The motive power from the input shaft 17 is transmitted through a power transmission shaft 34 to the ring gear 53 of the first planetary device 50.

The motive power from the input shaft 17 is transmitted from a power transmission gear 29 coupling the power transmission shafts 31 and 32 to each other through a power transmission shaft 35 to the continuously variable transmission device 18. The continuously variable transmission device 18 is of a hydraulic type, and outputs normal-direction motive power and reverse-direction motive power to be transmitted through a power transmission shaft 36 to the sun gear 51 of the first planetary device 50.

The first and second planetary devices 50 and 60 composite (i) the motive power transmitted from the engine 1 through the continuously variable transmission device 18 to the sun gear 51 of the first planetary device 50 and (ii) the motive power transmitted from the engine 1 not through the continuously variable transmission device 18 to the ring gear 53 of the first planetary device 50.

The motive power composited by the first and second planetary devices 50 and 60 is transmitted from the ring gear 63 of the second planetary device 60 to an output shaft 37, from the carrier 54 to an output shaft 39, and from the sun gear 61 of the second planetary device 60 to an output shaft 41.

Configuration of Power Transmission Device

As illustrated in FIG. 2, the power transmission device 19 includes first to fourth clutches CL1 to CL4 (each of which corresponds to the "hydraulically operable section") and an output shaft 38.

The motive power from the output shaft 37 is transmitted to the first clutch CL1. The motive power from the output shaft 39 is transmitted to the third clutch CL3. The motive power from the output shaft 41 is transmitted to the second and fourth clutches CL2 and CL4.

The first to fourth clutches CL1 to CL4 are of a hydraulic multi-disc type. The first to fourth clutches CL1 to CL4 are each urged to a disengaged state, and become engaged in response to receiving operating oil. The first to fourth clutches CL1 to CL4, in response to becoming engaged, each transmit its motive power to the output shaft 38.

Figure 3:
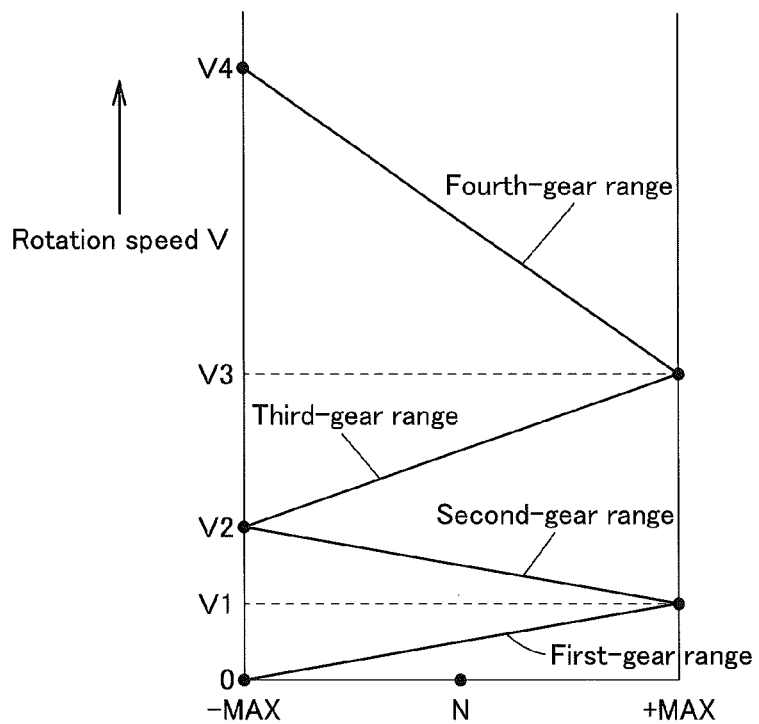
FIG. 3 is a graph that shows the relationship between the rotation speed of an output shaft and the gear position of a continuously variable transmission device.

Gear Change by Continuously Variable Transmission Device and Power Transmission Device FIG. 3 illustrates how the continuously variable transmission device 18 is related to the first to fourth clutches CL1 to CL4. FIG. 3 show "V" to indicate the rotation speed of the output shaft 38, "N" to indicate the neutral position of the continuously variable transmission device 18, "+MAX" to indicate the maximum speed by the normal-direction motive power of the continuously variable transmission device 18, and "−MAX" to indicate the maximum speed by the reverse-direction motive power of the continuously variable transmission device 18.

As illustrated in FIG. 2, in response to the first clutch CL1 becoming engaged, the motive power composited by the first and second planetary devices 50 and 60 is transmitted through the ring gear 63 of the second planetary device 60, the output shaft 37, and the first clutch CL1 to the output shaft 38.

In this state, varying the continuously variable transmission device 18 between −MAX and +MAX changes the rotation speed V of the output shaft 38 continuously between zero speed and a speed V1, as shown with "First-gear range" in FIG. 3.

As illustrated in FIG. 2, in response to the second clutch CL2 becoming engaged, the motive power composited by the first and second planetary devices 50 and 60 is transmitted through the sun gear 61 of the second planetary device 60, the output shaft 41, and the second clutch CL2 to the output shaft 38.

In this state, varying the continuously variable transmission device 18 between −MAX and +MAX changes the rotation speed V of the output shaft 38 continuously between the speed V1 and a speed V2, as shown with "Second-gear range" in FIG. 3.

As illustrated in FIG. 2, in response to the third clutch CL3 becoming engaged, the motive power composited by the first and second planetary devices 50 and 60 is transmitted through the carrier 54, the output shaft 39, and the third clutch CL3 to the output shaft 38.

In this state, varying the continuously variable transmission device 18 between −MAX and +MAX changes the rotation speed V of the output shaft 38 continuously between the speed V2 and a speed V3, as shown with "Third-gear range" in FIG. 3.

As illustrated in FIG. 2, in response to the fourth clutch CL4 becoming engaged, the motive power composited by the first and second planetary devices 50 and 60 is transmitted through the sun gear 61 of the second planetary device 60, the output shaft 41, and the fourth clutch CL4 to the output shaft 38.

In this state, varying the continuously variable transmission device 18 between −MAX and +MAX changes the rotation speed V of the output shaft 38 continuously between the speed V3 and a speed V4, as shown with "Fourth-gear range" in FIG. 3.

Configuration of Forward/Rearward Travel Switching Device

As illustrated in FIG. 2, the forward/rearward travel switching device 20 includes a forward-travel clutch CLF, a rearward-travel clutch CLR, power transmission shafts 40 and 42, and a relay gear 46. The power transmission shaft 40 receives the motive power from the output shaft 38.

The forward/rearward travel switching device 20 is configured such that in response to the forward-travel clutch CLF becoming engaged, the motive power from the power transmission shaft 40 is transmitted through the forward-travel clutch CLF to the power transmission shaft 42 in a forward-travel state and from the power transmission shaft 42 through the power transmission shaft 23 to the rear-wheel differential gear device 22.

The forward/rearward travel switching device 20 is configured such that in response to the rearward-travel clutch CLR becoming engaged, the motive power from the power transmission shaft 40 is transmitted through the rearward-travel clutch CLR and the relay gear 46 to the power transmission shaft 42 in a rearward-travel state and from the power transmission shaft 42 through the power transmission shaft 23 to the rear-wheel differential gear device 22.

Configuration of Front-Wheel Transmission Device

As illustrated in FIG. 2, the front-wheel transmission device 26 includes a standard clutch CLT, a speed-increasing clutch CLH, a power transmission shaft 43, and a front-wheel output shaft 45.

With each front wheel 6 at an angle within a range extending from the straight-travel position to predetermined left and right angles, the standard clutch CLT is in an engaged state.

In this state, the motive power from the power transmission shaft 23 is transmitted through the power transmission shafts 24 and 43 and the standard clutch CLT to the front-wheel output shaft 45 and through the power transmission shaft 27 and the front-wheel differential gear device 28 to the front wheels 6. This drives the front and rear wheels 6 and 7 at the same speed.

Turning each front wheel 6 to the left or right beyond the left or right predetermined angle causes the speed-increasing clutch CLH to become engaged.

In this state, the motive power from the power transmission shaft 23 is transmitted through the power transmission shafts 24 and 43 and the speed-increasing clutch CLH to the front-wheel output shaft 45 and through the power transmission shaft 27 and the front-wheel differential gear device 28 to the front wheels 6. This drives the front wheels 6 at a speed higher than the speed at which the rear wheels 7 are driven.

Configuration of Shaft Holder Holding Output Shaft

Figure 4:
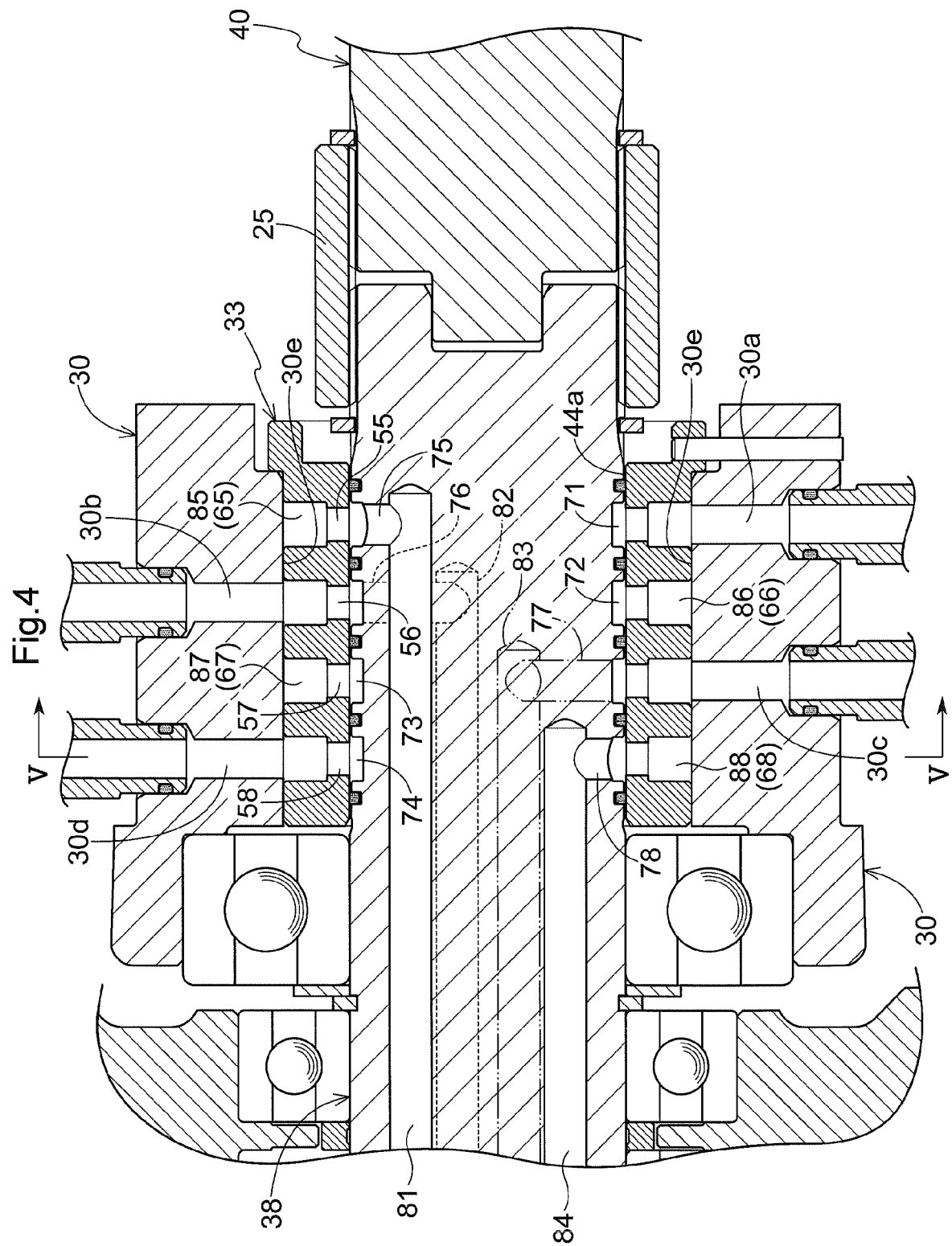
FIG. 4 is a cross-sectional side view of an output shaft, a shaft holder, a cylinder, and their surroundings.
Figure 5:
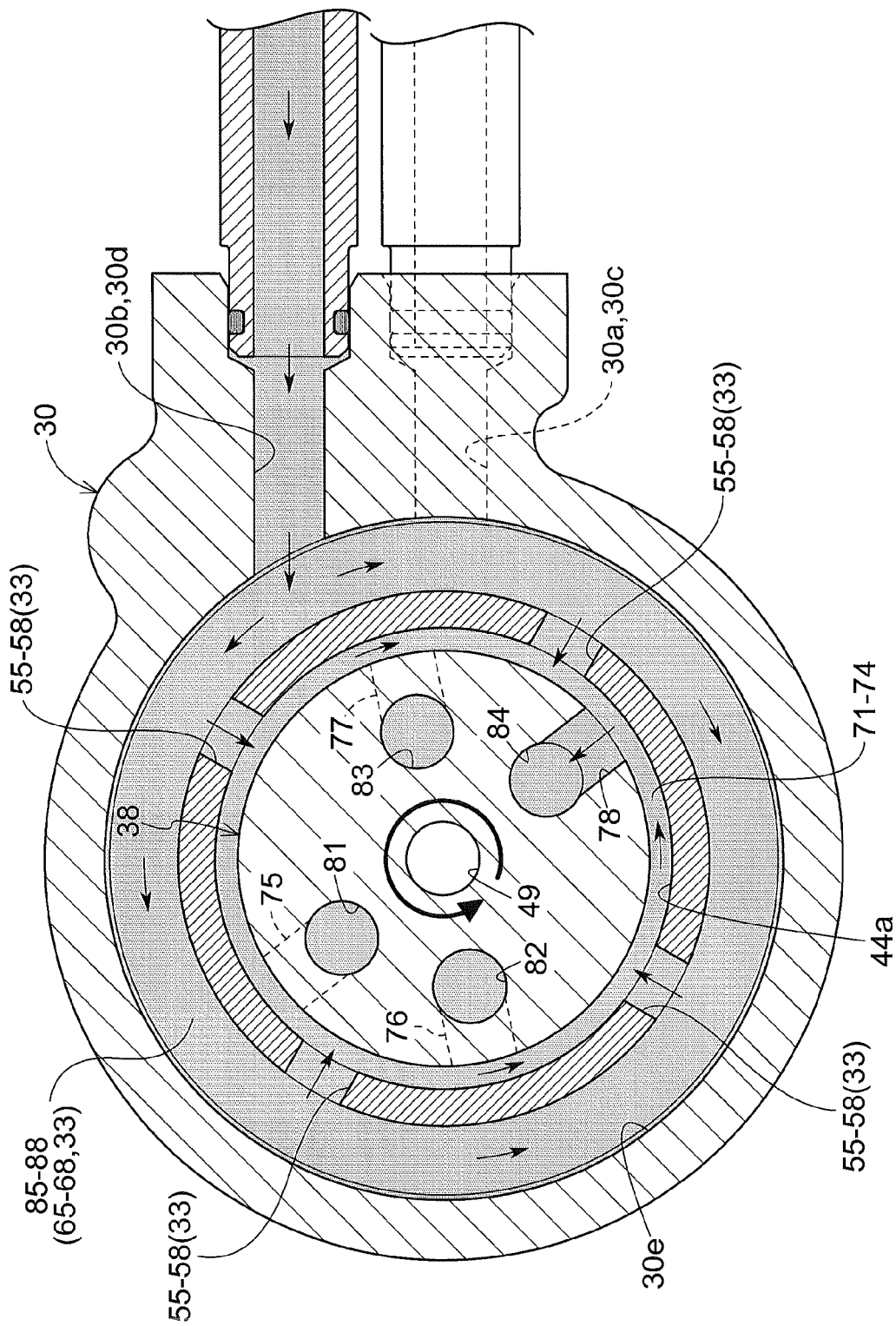
FIG. 5 is a cross-sectional view of the output shaft, the shaft holder, the cylinder, and their surroundings in FIG. 4 taken along line V-V.

As illustrated in FIGS. 2, 4, and 5, the output shaft 38 and the power transmission shaft 40 are coupled to each other with a cylindrical coupler 25. The transmission case 3 contains a shaft holder 30 near an end of the output shaft 38.

The shaft holder 30 has a cylindrical space in the longitudinal direction of the output shaft 38. The shaft holder 30 also has four supply ports 30a, 30b, 30c, and 30d (which correspond to the "first supply port") on an inner circumferential portion 30e defining the cylindrical space.

The supply ports 30a to 30d are arranged in the longitudinal direction of the inner circumferential portion 30e and evenly spaced from one another. Around the circumference of the inner circumferential portion 30e, the supply ports 30a and 30c are at the same phase, whereas the supply ports 30b and 30d are at the same phase, and the supply ports 30a and 30c are different in phase from the supply ports 30b and 30d.

Configuration of Cylinder Supporting Output Shaft

Figure 6:
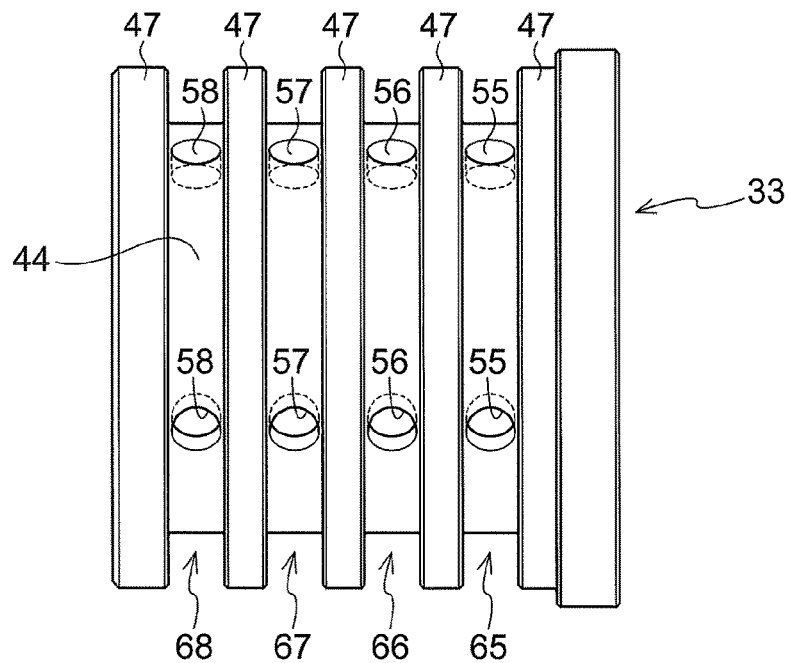
FIG. 6 is a side view of a cylinder.
Figure 7:
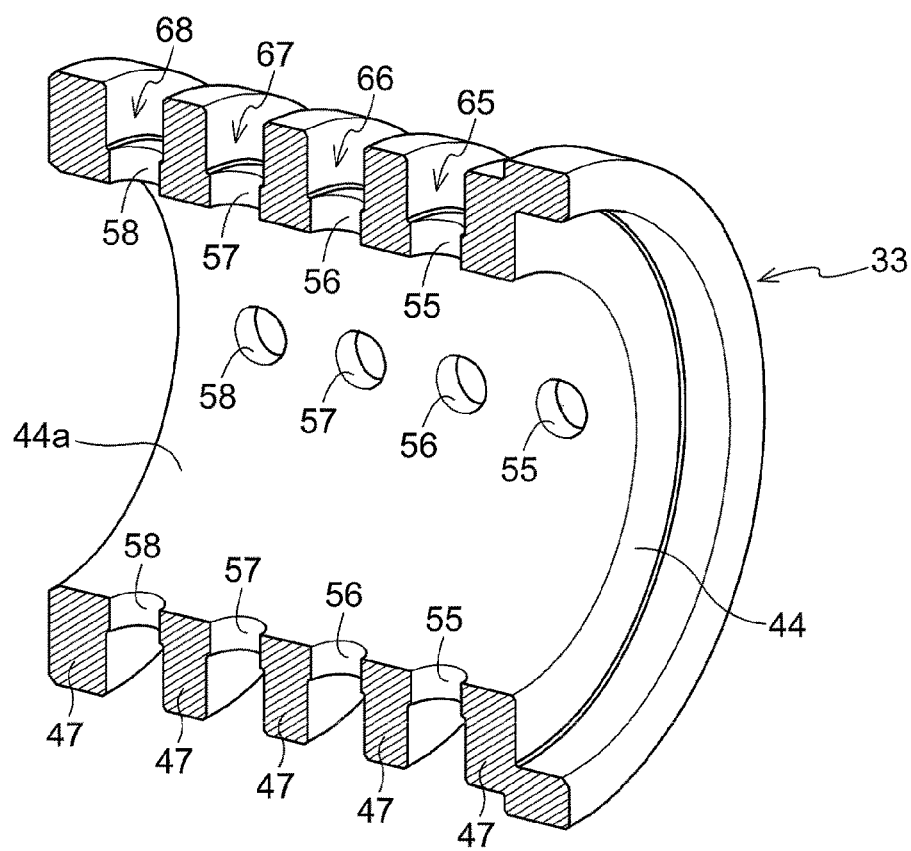
FIG. 7 is a perspective cross-sectional view of a cylinder.

As illustrated in FIGS. 4 and 5, the transmission case 3 contains a cylinder 33 attached to the inner circumferential portion 30e defining the cylindrical space in the shaft holder 30. As illustrated in FIGS. 6 and 7, the cylinder 33 includes a body 44, a plurality of rings 47, and supply ports 55, 56, 57, and 58 (which correspond to the "second supply port").

As illustrated in FIGS. 6 and 7, the body 44 is cylindrical. The rings 47 are at an outer circumferential portion of the body 44 and apart from one another in the longitudinal direction. The outer circumferential portion of the body 44 and the side faces of the rings 47 define a plurality of outer grooves 65, 66, 67, and 68 extending around the entire outer circumferential portion of the cylinder 33.

The outer groove 65 has four supply ports 55 evenly spaced from one another along the circumference of the body 44 and extending from the outer groove 65 to an inner circumferential portion 44a of the body 44.

The outer groove 66 has four supply ports 56, the outer groove 67 has four supply ports 57, and the outer groove 68 has four supply ports 58, similarly to the supply ports 55. The supply ports 55 to 58 are at the same phase along the circumference of the body 44.

Attaching the cylinder 33 to the inner circumferential portion 30e of the shaft holder 30 as illustrated in FIGS. 4 and 5 connects the supply port 30a of the shaft holder 30 with the outer groove 65 of the cylinder 33. This allows the supply port 30a to be between adjacent supply ports 55 of the cylinder 33 along its circumference.

The above attachment connects the supply port 30b of the shaft holder 30 with the outer groove 66 of the cylinder 33. This allows the supply port 30b to be between adjacent supply ports 56 of the cylinder 33 along its circumference.

The above attachment connects the supply port 30c of the shaft holder 30 with the outer groove 67 of the cylinder 33. This allows the supply port 30c to be between adjacent supply ports 57 of the cylinder 33 along its circumference.

The above attachment connects the supply port 30d of the shaft holder 30 with the outer groove 68 of the cylinder 33. This allows the supply port 30d to be between adjacent supply ports 58 of the cylinder 33 along its circumference.

Configuration of Output Shaft

Figure 8:
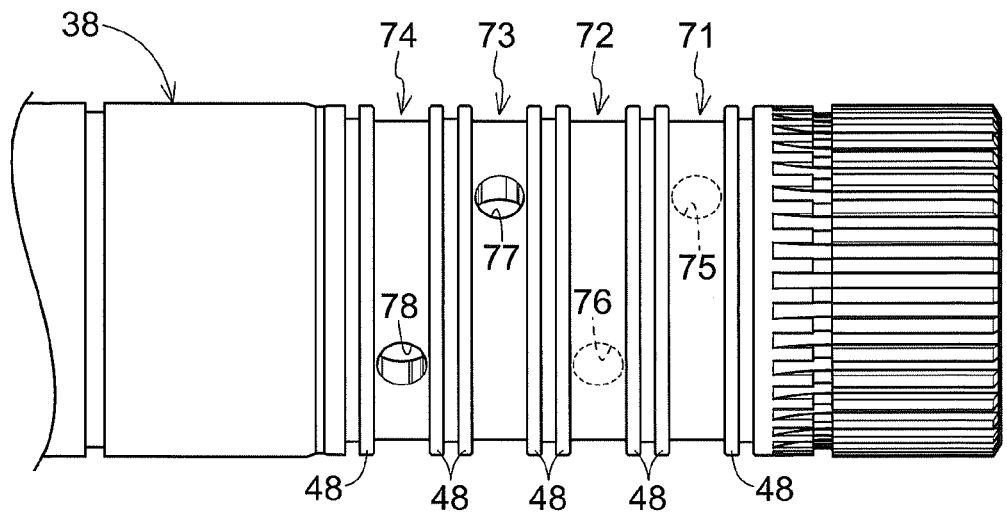
FIG. 8 is a side view of a portion of an output shaft which portion has shaft grooves.
Figure 9:
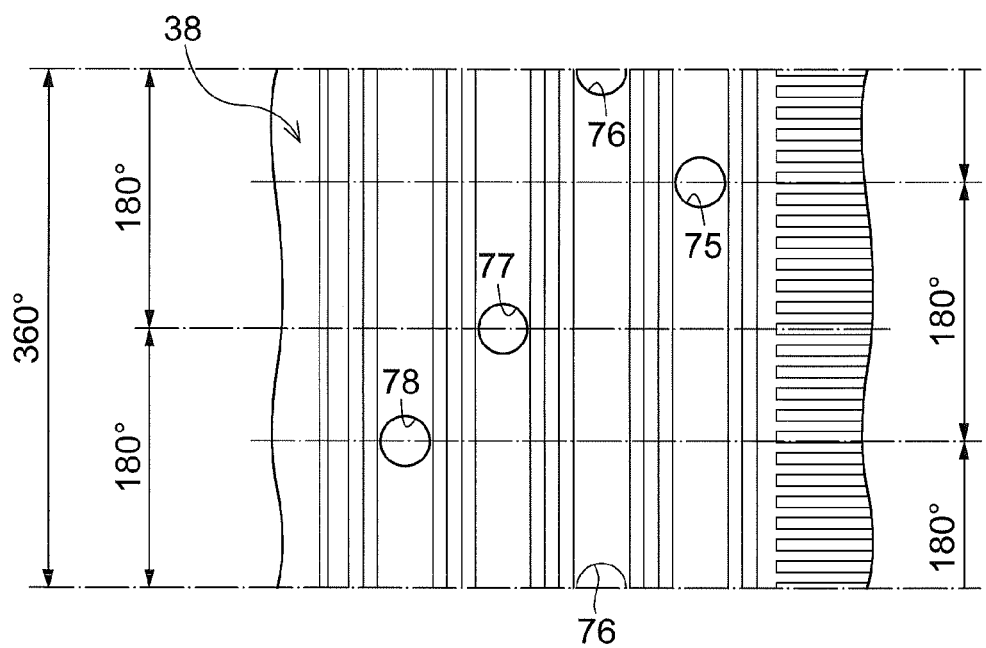
FIG. 9 is a development of a portion of an output shaft which portion has shaft grooves.

As illustrated in FIGS. 8 and 9, the output shaft 38 has an end provided with a plurality of rings 48 disposed around an outer circumferential portion of the output shaft 38 and spaced from one another in the longitudinal direction of the output shaft 38. The rings 48 define a plurality of shaft grooves 71, 72, 73, and 74 extending entirely around the outer circumferential portion of the output shaft 38.

As illustrated in FIGS. 4, 8, and 9, the output shaft 38 has a plurality of inlet ports 75, 76, 77, and 78 extending inside the output shaft 38 in the radial direction of the output shaft 38. The inlet ports 75 to 78 connect with the grooves 71 to 74, respectively.

As illustrated in FIGS. 4 and 5, the inlet ports 75 and 76 are apart from each other by a small distance and are at respective phases close to each other around the circumference of the output shaft 38, whereas the inlet ports 77 and 78 are apart from each other by a small distance and are at respective phases close to each other around the circumference of the output shaft 38. The inlet ports 75 and 78 are at respective phases exactly opposite to each other around the circumference of the output shaft 38, whereas the inlet ports 76 and 77 are at respective phases exactly opposite to each other around the circumference of the output shaft 38.

As illustrated in FIGS. 4 and 5, the output shaft 38 has an oil passage 49 extending inside the output shaft 38 in its longitudinal direction and configured to supply lubricating oil to different sections.

The output shaft 38 also has a plurality of supply oil passages 81, 82, 83, and 84 extending inside the output shaft 38 in its longitudinal direction. The supply oil passage 81 is connected with the inlet port 75 inside the output shaft 38 and with the first clutch CL1 (see FIG. 2).

The supply oil passage 82 is connected with the inlet port 76 inside the output shaft 38 and with the fourth clutch CL4 (see FIG. 2).

The supply oil passage 83 is connected with the inlet port 77 inside the output shaft 38 and with the second clutch CL2 (see FIG. 2).

The supply oil passage 84 is connected with the inlet port 78 inside the output shaft 38 and with the third clutch CL3 (see FIG. 2).

Relationship between Output Shaft, Shaft Holder, and Cylinder

As illustrated in FIGS. 6 and 7, the cylinder 33 has outer grooves 65 to 68 extending around the entire outer circumferential portion of the cylinder 33 along the circumference of the inner circumferential portion 30e of the shaft holder 30.

Attaching the cylinder 33 to the inner circumferential portion 30e of the shaft holder 30 as illustrated in FIGS. 4 and 5 causes the inner circumferential portion 30e and the outer grooves 65 to 68 to define a plurality of outer flow paths 85, 86, 87, and 88. This allows the shaft holder 30 to have outer flow paths 85 to 88 each in the shape of a ring around the corresponding one of the shaft grooves 71 to 74 of the output shaft 38 (power transmission shaft).

The supply ports 30a to 30d (first supply port) of the shaft holder 30 are connected with the outer flow paths 85 to 88 (outer grooves 65 to 68 of the cylinder 33), respectively.

The supply ports 55 to 58 (second supply port) of the cylinder 33 extend from the outer flow paths 85 to 88 (outer grooves 65 to 68 of the cylinder 33), respectively, to the inner circumferential portion 44a of the cylinder 33 (body 44).

Attaching the cylinder 33 to the inner circumferential portion 30e of the shaft holder 30 allows the inner circumferential portion 44a (see FIG. 7) of the cylinder 33 (body 44) to serve as the inner circumferential portion 30e of the shaft holder 30.

As a result, the supply ports 55 to 58 (second supply port) of the cylinder 33 extend from the outer flow paths 85 to 88 (outer grooves 65 to 68 of the cylinder 33), respectively, to the inner circumferential portion 30e of the shaft holder 30 (inner circumferential portion 44a of the cylinder 33 (body 44)).

The supply ports 55 (second supply port) of the cylinder 33 are in communication with the shaft groove 71 of the output shaft 38 (power transmission shaft). The supply ports 56 (second supply port) of the cylinder 33 are in communication with the shaft groove 72 of the output shaft 38 (power transmission shaft).

The supply ports 57 (second supply port) of the cylinder 33 are in communication with the shaft groove 73 of the output shaft 38 (power transmission shaft). The supply ports 58 (second supply port) of the cylinder 33 are in communication with the shaft groove 74 of the output shaft 38 (power transmission shaft).

As illustrated in FIGS. 5, 6, and 7, the cylinder 33 has a plurality of supply ports 55 to 58 (second supply port) spaced from one another along the circumference of the inner circumferential portion 30e of the shaft holder 30.

As illustrated in FIG. 5, the supply ports 30a to 30d (first supply port) of the shaft holder 30 are between adjacent supply ports 55 to 58 (second supply port) of the cylinder 33 along its circumference. The supply ports 30a to 30d (first supply port) are thus positioned differently from the supply ports 55 to 58 (second supply port) along the circumference of the inner circumferential portion 30e.

As illustrated in FIG. 4, the outer flow paths 85 to 88 (outer grooves 65 to 68 of the cylinder 33) each have a first cross-sectional area on a plane orthogonal to the circumference of the inner circumferential portion 30e of the shaft holder 30, whereas the shaft grooves 71 to 74 of the output shaft 38 each have a second cross-sectional area on a plane orthogonal to the circumference of the output shaft 38 (power transmission shaft), the first cross-sectional area being larger than the second cross-sectional area.

How Operating Oil is Supplied to First to Fourth Clutches

As illustrated in FIGS. 4 and 5, supplying operating oil to the supply ports 30a to 30d (first supply port) of the shaft holder 30 causes the operations below.

The operating oil supplied to the supply port 30a (first supply port) of the shaft holder 30 is then supplied from the supply port 30a through the outer flow path 85 (outer groove 65 of the cylinder 33), the supply ports 55 (second supply port) of the cylinder 33, the shaft groove 71 of the output shaft 38 (power transmission shaft), the inlet port 75, and the supply oil passage 81 to the first clutch CL1 (hydraulically operable section) (see FIG. 2) to cause the first clutch CL1 to become engaged.

The operating oil supplied to the supply port 30b (first supply port) of the shaft holder 30 is then supplied from the supply port 30b through the outer flow path 86 (outer groove 66 of the cylinder 33), the supply ports 56 (second supply port) of the cylinder 33, the shaft groove 72 of the output shaft 38 (power transmission shaft), the inlet port 76, and the supply oil passage 82 to the fourth clutch CL4 (hydraulically operable section) (see FIG. 2) to cause the fourth clutch CL4 to become engaged.

The operating oil supplied to the supply port 30c (first supply port) of the shaft holder 30 is then supplied from the supply port 30c through the outer flow path 87 (outer groove 67 of the cylinder 33), the supply ports 57 (second supply port) of the cylinder 33, the shaft groove 73 of the output shaft 38 (power transmission shaft), the inlet port 77, and the supply oil passage 83 to the second clutch CL2 (hydraulically operable section) (see FIG. 2) to cause the second clutch CL2 to become engaged.

The operating oil supplied to the supply port 30d (first supply port) of the shaft holder 30 is then supplied from the supply port 30d through the outer flow path 88 (outer groove 68 of the cylinder 33), the supply ports 58 (second supply port) of the cylinder 33, the shaft groove 74 of the output shaft 38 (power transmission shaft), the inlet port 78, and the supply oil passage 84 to the third clutch CL3 (hydraulically operable section) (see FIG. 2) to cause the third clutch CL3 to become engaged.

First Alternative Embodiment

The cylinder 33 may have, for each outer groove 65, 66, 67, 68 (outer flow path 85, 86, 87, 88), two or three supply ports 55, 56, 57, 58 or five or six supply ports 55, 56, 57, 58.

Second Alternative Embodiment

The cylinder 33 may have supply ports 55 to 58 in different numbers for the respective outer grooves 65 to 68 (outer flow paths 85 to 88).

The cylinder 33 may have supply ports 55 to 58 at different phases along the circumference of the cylinder 33 for the respective outer grooves 65 to 68 (outer flow paths 85 to 88).

The cylinder 33 may have supply ports 55 to 58 unevenly spaced from one another along the circumference of the cylinder 33.

Third Alternative Embodiment

The configurations illustrated in FIGS. 4 to 9 and the first and second alternative embodiments may be applied to the forward-travel clutch CLF and rearward-travel clutch CLR of the forward/rearward travel switching device 20 or the standard clutch CLT and speed-increasing clutch CLH of the front-wheel transmission device 26.

This case includes two hydraulically operable sections. The shaft holder 30 thus has two supply ports 30a and 30b. The cylinder 33 has two outer grooves 65 and 66 (outer flow paths 85 and 86) and two sets of supply ports 55 and 56. The power transmission shafts 40 and 43 have two shaft grooves 71 and 72, two inlet ports 75 and 76, and two supply oil passages 81 and 82.

Fourth Alternative Embodiment

The configurations illustrated in FIGS. 4 to 9 and the first and second alternative embodiments may be applied to the PTO clutch 15.

This case includes a single hydraulically operable section. The shaft holder 30 thus has a single supply port 30a. The cylinder 33 has a single outer groove 65 (outer flow path 85) and a single set of supply ports 55. The power transmission shaft 32 has a single shaft groove 71, a single inlet port 75, and a single supply oil passage 81.

Fifth Alternative Embodiment

The transmission case 3 may not contain a cylinder 33. With this configuration, the shaft holder 30 not only has supply ports 30a to 30d, but also directly has outer flow paths 85 to 88 and supply ports 55 to 58.

The operating oil may be supplied, instead of from the supply oil passages 81 to 84 to the hydraulic clutch, through the supply oil passages 81 to 84 to a hydraulic operation section (corresponding to the "hydraulically operable section") configured to slide a transmission gear of a gear shift device.

The present invention is applicable to not only tractors but also agricultural work vehicles such as combines and riding-type rice transplanters and construction work vehicles such as backhoes and wheel loaders.

REFERENCE SIGNS LIST

30 Shaft support
30a to 30d Supply port (first supply port)
30e Inner circumferential portion
33 Cylinder
38 Output shaft (power transmission shaft)
44a Inner circumferential portion
55 to 58 Supply port (second supply port)
65 to 68 Outer groove
71 to 74 Shaft groove
75 to 78 Inlet port
81 to 84 Supply oil passage
85 to 88 Outer flow path
CL1 First clutch (hydraulically operable section)
CL2 Second clutch (hydraulically operable section)
CL3 Third clutch (hydraulically operable section)
CL4 Fourth clutch (hydraulically operable section)

What is claimed is:
1. A work vehicle, comprising:
a power transmission shaft drivable to rotate;
a shaft holder holding the power transmission shaft in such a manner that the power transmission shaft is rotatable; and
a hydraulically operable section configured to operate in response to receiving operating oil,
the power transmission shaft including:
a shaft groove extending entirely around an outer circumferential portion of the power transmission shaft;
an inlet port extending inside the power transmission shaft in a radial direction of the power transmission shaft and connected with the shaft groove; and
a supply oil passage extending inside the power transmission shaft in a longitudinal direction of the power transmission shaft and connected with the inlet port inside the power transmission shaft, the shaft holder including:
- an outer flow path in a shape of a ring along a circumference of the power transmission shaft around the shaft groove;
- a first supply port connected with the outer flow path and configured to receive operating oil; and
- at least one second supply port extending from the outer flow path to an inner circumferential portion of the shaft holder and communicating with the shaft groove, the work vehicle being configured to cause operating oil to be supplied from the first supply port sequentially through the outer flow path, the at least one second supply port, the shaft groove, the inlet port, and the supply oil passage to the hydraulically operable section.

2. The work vehicle according to claim 1, wherein the at least one second supply port includes a plurality of second supply ports spaced from each other along a circumference of the inner circumferential portion of the shaft holder.

3. The work vehicle according to claim 2, wherein the first supply port is positioned differently from the plurality of second supply ports along the circumference of the inner circumferential portion of the shaft holder.

4. The work vehicle according to claim 3, wherein the outer flow path has a first cross-sectional area on a plane orthogonal to the circumference of the inner circumferential portion of the shaft holder, whereas the shaft groove has a second cross-sectional area on a plane orthogonal to a circumference of the power transmission shaft, the first cross-sectional area being larger than the second cross-sectional area.

5. The work vehicle according to claim 1, further comprising:
- a cylinder attached to the inner circumferential portion of the shaft holder and holding the power transmission shaft in such a manner that the power transmission shaft is rotatable to allow the shaft holder to hold the power transmission shaft in such a manner that the power transmission shaft is rotatable, wherein
the cylinder includes an outer groove extending entirely around an outer circumferential portion of the cylinder along a circumference of the inner circumferential portion of the shaft holder and defining the outer flow path together with the inner circumferential portion of the shaft holder, and
the at least one second supply port is provided for the cylinder and extends from the outer groove to an inner circumferential portion of the cylinder.

6. A work vehicle, comprising:
a power transmission shaft drivable to rotate;
a shaft holder holding the power transmission shaft in such a manner that the power transmission shaft is rotatable; and
a hydraulically operable section configured to operate in response to receiving operating oil,
the power transmission shaft including:
- a shaft groove extending entirely around an outer circumferential portion of the power transmission shaft;
- an inlet port extending inside the power transmission shaft in a radial direction of the power transmission shaft and connected with the shaft groove; and
- a supply oil passage extending inside the power transmission shaft in a longitudinal direction of the power transmission shaft and connected with the inlet port inside the power transmission shaft, the shaft holder including:
- an outer flow path in a shape of a ring around the shaft groove;
- a first supply port connected with the outer flow path and configured to receive operating oil; and
- at least one second supply port extending from the outer flow path to an inner circumferential portion of the shaft holder and communicating with the shaft groove, the work vehicle being configured to cause operating oil to be supplied from the first supply port sequentially through the outer flow path, the at least one second supply port, the shaft groove, the inlet port, and the supply oil passage to the hydraulically operable section, and the outer flow path has a first cross-sectional area on a plane orthogonal to the circumference of the inner circumferential portion of the shaft holder, whereas the shaft groove has a second cross-sectional area on a plane orthogonal to a circumference of the power transmission shaft, the first cross-sectional area being larger than the second cross-sectional area.

* * * * *